(12) United States Patent
Orita

(10) Patent No.: US 7,765,028 B2
(45) Date of Patent: Jul. 27, 2010

(54) ROBOT CONTROL APPARATUS

(75) Inventor: Atsuo Orita, Saitama (JP)

(73) Assignee: Honda Motor Co., Ltd., Minato-Ku, Tokyo (JP)

( * ) Notice: Subject to any disclaimer, the term of this patent is extended or adjusted under 35 U.S.C. 154(b) by 1499 days.

(21) Appl. No.: 11/108,723

(22) Filed: Apr. 19, 2005

(65) Prior Publication Data

US 2005/0256610 A1 Nov. 17, 2005

(30) Foreign Application Priority Data

May 13, 2004 (JP) .............................. 2004-143884

(51) Int. Cl.
*G05B 19/418* (2006.01)
*G06F 19/00* (2006.01)
*G05B 19/00* (2006.01)

(52) U.S. Cl. ..................... 700/248; 700/245; 700/101; 700/264; 718/104

(58) Field of Classification Search ................ 700/248, 700/249, 247, 101, 102, 100, 103, 99, 245, 700/264; 718/103, 104; 705/1, 9
See application file for complete search history.

(56) References Cited

U.S. PATENT DOCUMENTS

| | | | | |
|---|---|---|---|---|
| 5,963,911 | A * | 10/1999 | Walker et al. ................... | 705/7 |
| 6,351,685 | B1 * | 2/2002 | Dimitri et al. ................ | 700/214 |
| 6,374,155 | B1 * | 4/2002 | Wallach et al. .............. | 700/245 |
| 6,609,046 | B2 * | 8/2003 | Ostwald et al. ............. | 700/214 |
| 6,829,764 | B1 * | 12/2004 | Cohen et al. ................. | 718/103 |
| 6,983,188 | B2 * | 1/2006 | Loughran et al. ............. | 700/99 |
| 7,254,464 | B1 * | 8/2007 | McLurkin et al. ........... | 700/245 |

FOREIGN PATENT DOCUMENTS

| | | |
|---|---|---|
| JP | 62-85305 | 4/1987 |
| JP | 03-051300 | 3/1991 |
| JP | 07-230316 | 8/1995 |
| JP | 2001-062760 | 3/2001 |
| JP | 2001-156145 | 6/2001 |
| JP | 2001-191279 | 7/2001 |
| JP | 2003-122586 | 4/2003 |
| JP | 2003-291083 | 10/2003 |
| JP | 2003-345435 | 12/2003 |

\* cited by examiner

*Primary Examiner*—Thomas G Black
*Assistant Examiner*—Christine M Behncke
(74) *Attorney, Agent, or Firm*—Squire, Sanders & Dempsey L.L.P.

(57) ABSTRACT

The robot control apparatus has an input-output section, a control section including a priority data generation section, a schedule data generation section, an execution command generation section, and a task data dividing section, a map information database, individual information database, a robot information database, and a task information database. The priority data generation section generates priority data for task data, stored in a task control database that that has not been executed. The schedule data generation section generates schedule data by assigning tasks to the robots on the basis of the priority data to generate schedule data. The execution command generation section generates execution commands for causing the robots to execute the tasks.

45 Claims, 10 Drawing Sheets

US 7,765,028 B2

ROBOT CONTROL APPARATUS

FIELD OF THE INVENTION

The present invention relates to a robot control apparatus for commanding a robot to execute a task, and particularly to a robot control apparatus for commanding a plurality of autonomous mobile robots to execute one or more tasks.

BACKGROUND OF THE INVENTION

A robot system is known in which various kinds of operations (hereinafter referred to as tasks) are performed with a plurality of robots. Japanese laid-open patent application publication 2003-291083 discloses a robot apparatus in which a task is performed by a plurality of robot apparatuses (paragraphs 0016 to 0045, FIGS. 1-5). This robot apparatus includes a task execution judging section that determines whether a task can be accomplished. If the task execution judging section determines that the task cannot be accomplished, the robot apparatus searches another robot that can execute the task and commands the robot to execute the task substantially at the same time.

SUMMARY OF THE INVENTION

An aspect of the present invention provides a robot control apparatus, communicable with a plurality of robots that include locomotive functions, for executing one or more tasks, comprising: an input-output section for receiving the tasks as task data; a task data storing section for storing the tasks from the input-output section; a priority data generation section for generating priority data indicating values of priorities regarding execution of the stored tasks at least in accordance with the tasks; a schedule data generation section for generating, in accordance with the priority data, schedule data indicating which one of robots is commanded to execute each of the tasks and execution order of the tasks; an execution command generation section for generating an execution command for commanding a one of the robots to execute one of the tasks with a highest ranking of the execution order; and a transmitting section for transmitting the execution command to the one of robots through the input-output section.

Preferably, the task data of each task includes a value of scheduled task start time indicating a value of start time of the task, and the priority data is generated such that the closer to the scheduled task start time time when the priority data is generated is, the higher the priority becomes.

Further, each of the tasks may include scheduled task start time indicating the start time of the task, and the priority data may be generated such that one of the tasks has first and second priorities at first and following second timing of generation of the priority data before the scheduled task start time, respectively, and the second priority is higher than the first priority. Further, first and second of the tasks may include first and following second scheduled task start time indicating the start timing of the first and second of the tasks, respectively, and the priority data may be generated before the first scheduled task start time such that the first and second of the tasks have first and second priorities, respectively, and the first priority being higher than the second priority. The priority data may be generated repeatedly, for example, when a new task is received, when a task has been completed, or when an unexecuted task is cancelled.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Prior to describing an embodiment of the present invention, the related art disclosed in Japanese laid-open patent application publication 2003-291083 will be further argued.

The related art robot apparatus is considered to be problematic as follows:

First, the related art robot has a large load of judging operation on the robot because it should make a decision as to whether the task can be accomplished.

Second, the related art robot has a large load of communication operation because it should search another robot apparatus if the robot apparatus determines that the task cannot be accomplished.

Third, when a plurality of tasks are performed by a plurality of related art robot apparatuses, optimization has not been done in judgment as to which one of tasks is judged by each robot and as to which one of tasks is performed by each robot. As a result, although all tasks can be performed, a traveling distance may be extremely large or the completion time of the task may be delayed, so that the tasks are executed with combination of operations having low efficiencies.

The present invention provides a robot control apparatus communicable with a plurality of movable robots to command the robots to efficiently execute a plurality of tasks.

An embodiment according to the present invention will be described with an example in which the present invention is applied to reception operation in an enterprise with reference to drawings where the same element or parts are designated with the same or corresponding references, and thus, duplicated description is omitted.

Structure of Robot Control System A

Figure 1:
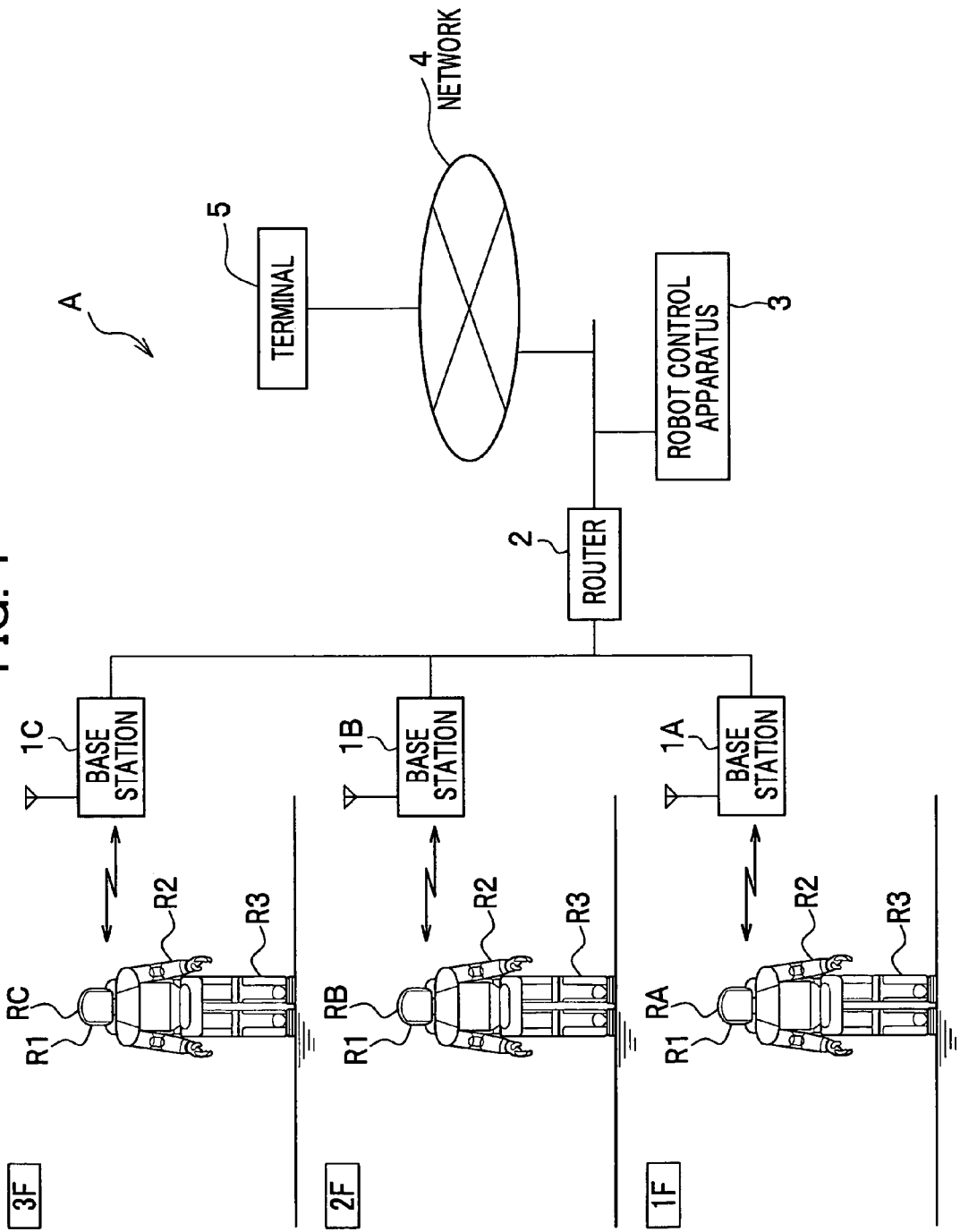
FIG. 1 is a block diagram of a robot control system of an embodiment according to the present invention.

First, a robot control system according to the embodiment of the present invention will be described. FIG. 1 shows the robot control system according to the embodiment of the present invention.

The robot control system A schedules tasks on the basis of priority data and transmits execution commands for the tasks on the basis of the provided schedule, and robots RA, RB, and RC which receive the execution commands execute the task.

The robot control system A comprises, as shown in FIG. 1, the robots RA, RB, and RC located at floors of a building, respectively, base stations 1A, 1B, and 1C wirelessly coupled to these robots RA, RB, and RC (for example, wireless LAN), a router 2, a robot control apparatus (for example, a server) 3 coupled to the base stations 1A, 1B, and 1C through the router 2, and a terminal 5 coupled to the robot control apparatus 3 through a network (LAN) 4. Hereinafter, the base stations 1A, 1B, or 1C is also referred to as a base station 1 if the interesting base station 1 should not be distinguished from the others.

The robots RA, RB, and RC are arranged at the first, second, and third floors to perform tasks to be performed basically at the first to third floors, respectively. However, if an amount of a task at a floor is extremely large, another robot at another floor can move to the floor to cooperatively perform the task shared therebetween.

The base stations 1A, 1B, and 1C are arranged at the first, second, and third floors to communicate with robots RA, RB, and RC at the first to third floors, respectively. Hereinafter, the robot RA, RB, or RC is also referred to as a robot R if the interesting robot should not be distinguished from the others. The base station 1 can communicate with more than one robot R at each floor if one or more robot R moves to a floor where one robot R exists.

Configurations of the robot R and the robot control apparatus 3 will be described in detail.

Robot R

The robot R according to the present embodiment is an autonomous mobile type of biped locomotion robot. The robot R executes a task on the basis of the execution command transmitted from the robot control apparatus 3.

Figure 2:
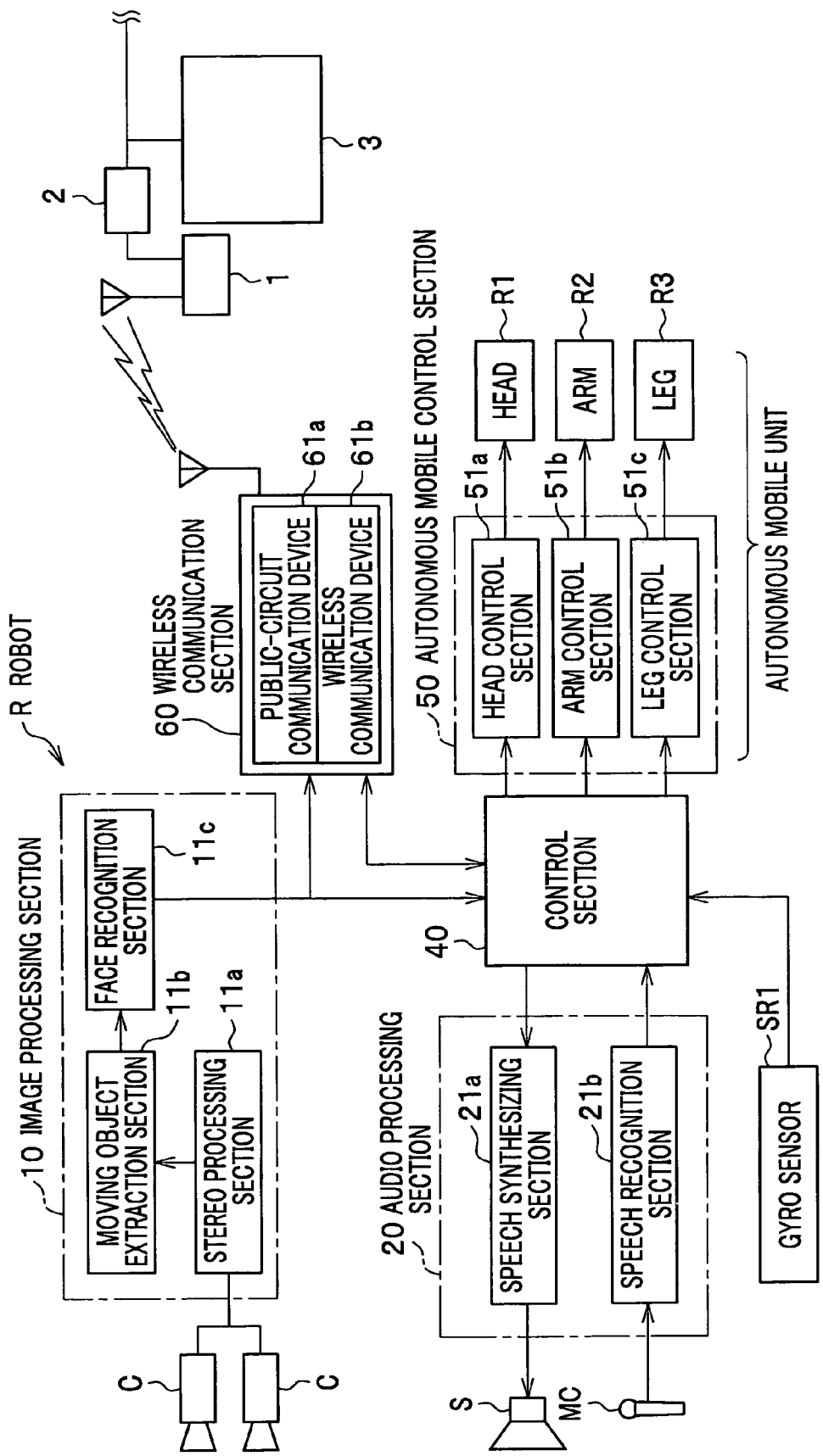
FIG. 2 is a block diagram of a robot of the embodiment according to the present invention.

The robot R comprises, as shown in FIG. 1, a head R1, arms R2, legs R3, which are driven by actuators (not shown), respectively, and the biped locomotion is controlled by the autonomous mobile control section 50 (see FIG. 2). The biped locomotion is disclosed, for example, in Japanese laid-open patent application publication No. 2001-62760.

FIG. 2 shows a configuration of the robot R.

The robot R further comprises, as shown in FIG. 2, cameras C, a speaker S, a microphone MC, an image processing section 10, an audio processing section 20, a control section 40, the autonomous mobile control section 50, and a wireless communication section 60.

Furthermore, the robot R comprises a gyro SR1 for detecting the direction of the robot R itself.

Camera C

The cameras C can take images as digital data. For example, color CCD (Charge-Coupled Device) cameras are used. The cameras C are arranged in parallel and the shot images are supplied to the image processing section 10. The cameras C, the speaker S, and the microphone MC are arranged inside the head R1.

Image Processing Section 10

The image processing section 10 recognizes, for example, obstacles, and human beings therearound to recognize the situation around the robot R from the shot images after processing. The image processing section 10 comprises a stereo processing section 11a, a moving object extraction section 11b, and a face recognition section 11c.

The stereo processing section 11a executes pattern comparison between two images shot at the same time by the cameras C at left and right portions of the head R1 in which one of the images is used as reference to calculate parallaxes between corresponding pixels in the left and right images to produce a parallax image that is supplied to the moving object extraction section 11b together with the original images. The parallax indicates a distance between the robot R and the shot object.

The moving object extraction section 11b extracts a moving object in the shot images on the basis of the data at an output of the stereo processing section 11a. The extraction of moving objects is made to recognize a human being with assumption that the moving object is a human being.

The moving object extraction section 11b stores several frames of past images to extract a moving object, and compares the frames of past images with the frame of the latest image to execute the pattern comparison, calculating amounts of moving of pixels, respectively, to produce an amount-of-moving image (image data of which each pixel or each block of pixels indicating an amount of movement of the pixel or pixels). The moving object extraction section 11b determines that a human being exists there when there are pixels showing a larger amount of movement (larger than a threshold) within a predetermined distance from the cameras C from the parallax image and the amount-of-moving image to extract the moving object as a parallax image only within the predetermined distance region, to supply the image of the moving object to the face recognition section 11c.

The face recognition section 11c extracts image portions showing flesh color from the extracted moving object to determine the position of the face from the sizes and shapes of the extracted image portions. Similarly, positions of the hands are also determined from the sizes and shapes of the image portions showing the flesh color.

The position of the determined face is supplied to the control section 40 to be used as information used upon movement of the robot R and used for communication with the human being and to the wireless communication section 60 to transmit it to the robot control apparatus 3 through the base station 1.

Audio Processing Section 20

The audio processing section 20 comprises a speech synthesizing section 21a and a speech recognition section 21b.

The speech synthesizing section 21a generates speech data from character information on the basis of a command for a speech act determined and transmitted by the control section 40 to produce voice by the speaker S. The speech data is generated using corresponding relations previously stored between the character information and the voice data.

The speech recognition section 21b is supplied with the speech data from the microphone MC and generates the character information from the speech data on the basis of the corresponding relation previously stored between the voice data and the character information to supply it to the control section 40.

The speech synthesizing section 21a, the speech recognition section 21b, and the control section 40 provide communication between the robot R and the human being. Further, the image processing section 10 and the control section provides communication through a gesture or action between the human beings or the robot R.

Autonomous Mobile Control Section 50

The autonomous mobile control section 50 comprises a head control section 51a, an arm control section 51b, and a leg control section 51c.

The head control section 51a drives the head R1 in accordance with a command from the control section 40. The arm control section 51b drives the arms R2 in accordance with the command from the control section 40. The leg control section 51c drives the legs R3 in accordance with the command from the control section 40. The autonomous mobile control section 50, the head R1, the arms R2, and the legs form an autonomous mobile unit.

The detection data generated by the gyro SR1 is supplied to the control section 40 that uses the data to determine the action of the robot R and is transmitted from the control section 40 to the robot control apparatus 3 through the wireless communication section 60.

Wireless Communication Section 60

The wireless communication section 60 is a communication device for transmitting and receiving data from the robot control apparatus 3. The wireless communication section 60 comprises a public-circuit communication device 61a and a wireless communication device 61b.

The public-circuit communication device 61a is a wireless communication means using a public circuit such as a cellular phone line or a PHS (personal Handyphone System) line. On the other hand, the wireless communication device 61b is a wireless communication means for Near Field Communication(NFC) such as a wireless LAN based on the standard of IEEE 802.11b.

The wireless communication section 60 performs data communication with the robot control apparatus 3 in response to a connection request from the robot control apparatus 3 in which either of the public-circuit communication device 61a or the wireless communication device 61b is selected.

Robot Control Apparatus 3

Figure 3:
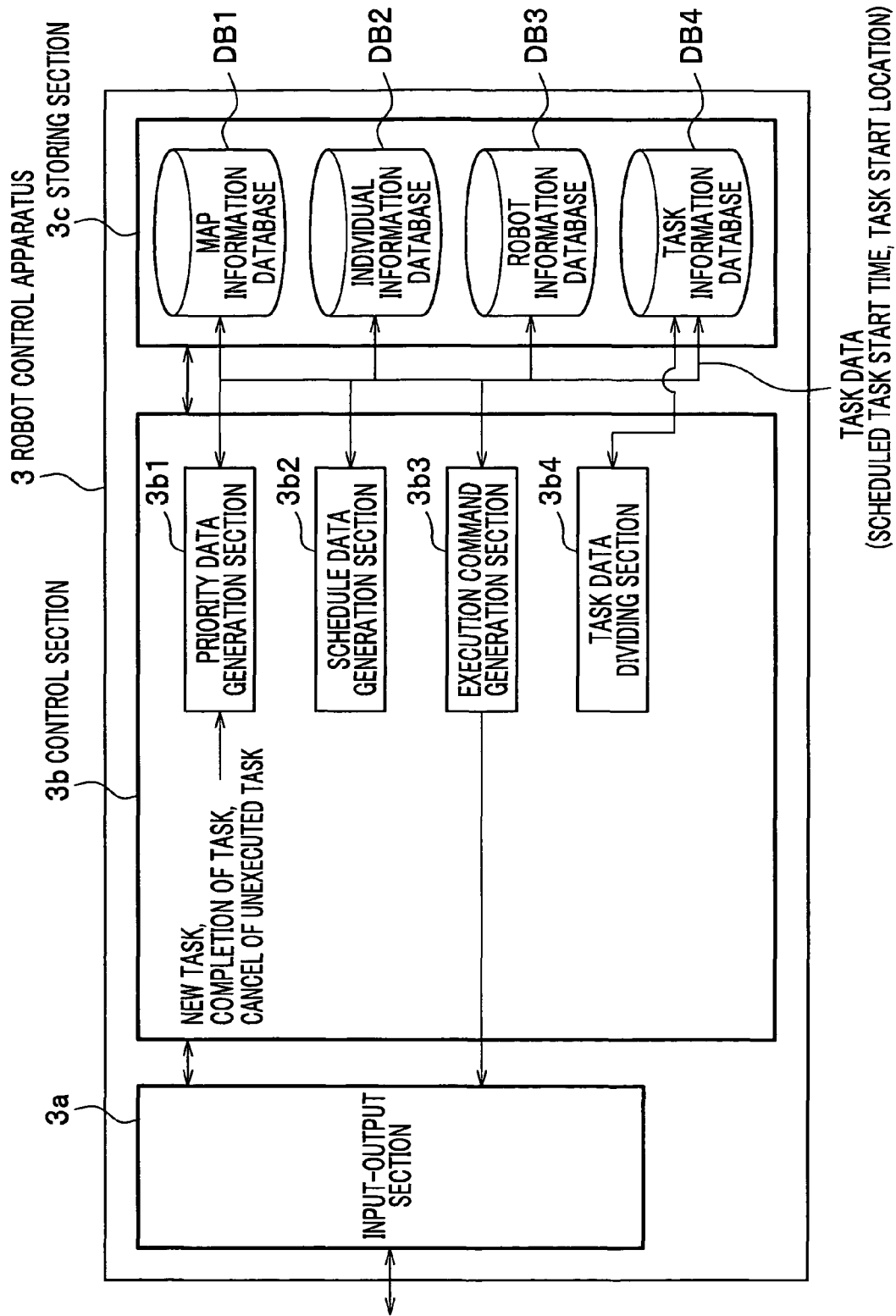
FIG. 3 is a block diagram of a robot control apparatus of the embodiment according to the present invention.

FIG. 3 shows a configuration of the robot control apparatus 3. The robot control apparatus 3 comprises an input-output section 3a, a control section 3b including a priority data generation section 3b1, a schedule data generation section 3b2, an execution command generation section 3b3, and a task data dividing section 3b4, and a storing section 3c including a map information database (the map data storing section) DB1, an individual information database (individual data storing section) DB2, a robot information database (robot data storing section) DB3, and a task information database (task data storing section) DB4. The schedule data generation section 3b2, the execution command generation section 3b3, and the task data dividing section 3b4 are provided by respective programs, for example, in a not-shown ROM (Read-Only-Memory) that are executed by a processor (not shown) in the robot control apparatus 3.

Map Information Database DB1

The map information database DB1 stores map information (global map or a local area map) for autonomous movement and regarding a location where a task is to be executed. The map information includes information of passages, stairways, elevators, and rooms within an autonomous movable region of the robot R. The robot R is autonomously movable within the region walkable with the map information. In other words, the map information database DB1 is used for autonomous movement of the robot R, so that the robot R can immediately move to a desired location (for example, a task start location).

The map information can be updated by operation by an operator with the terminal 5.

Individual Information Database DB2

The individual information database DB2 is a database for storing information (individual information) regarding individuals (visitors).

The individual data includes at least individual identification (ID) data and further includes information regarding names, ages, sexes, membership names, names of job posts, and face images. The individual data is used for recognizing a visitor and communication in accordance with the visitor as well as used for obtaining degrees of importance of the tasks mentioned later.

The individual data can be updated by operation of the terminal 5 by the operator and also can be updated through communication between the robot R and the visitor.

Robot Information Database DB3

The robot information database DB 3 is a database for storing robot data regarding operation statuses of the robots.

The robot data includes at least information regarding robot identification (ID) and current locations and further includes, for example, remaining amounts of energy in batteries (not shown), the presence and the absence of failure in the driving systems.

The robot data is generated by the control section 40 of the robot R and stored in the robot information database Db3 through the wireless communication section 60 and the base station 1.

There is possible data transmission timing of the robot data such as periodical transmission, transmission when the operation status of the robot R varies in such a case where a remaining amount of a battery is less than a predetermined value or when failure occurs at the drive system, and transmission when a robot data request signal is received from the robot control apparatus 3. In this embodiment, combination thereof is adopted.

Task Information Database DB4

The task data is data regarding tasks to be executed by the robots R and includes information regarding task identifications (ID), task start locations (value of task start locations), task completion locations (value of task completion locations), scheduled task start time (after traveling to the task start location), scheduled task completion time, contents of the tasks, such as reception or information operation, individual identifications (ID), and degrees of importance of the tasks. The scheduled task completion time may be originally included in the inputted task data as a value, and the time when the task is to be executed may be obtained by calculation from the scheduled task start time, the task start location, the task completion location, and the content of the task.

The task data can be updated by the operation by the operator with the terminal 5 and can be updated with a task generated through communication of the robot R with the visitor. Further, a task in the task information database DB4 may be cancelled by the operator with the terminal 5, namely, the task data of the task data may be deleted by the operator.

Input-Output Section 3a

The input-output section 3a is an interface for data transmission and reception with the robots R and the terminal 5 through the base stations 1 and the network 4.

Priority Data Generation Section 3b1

The priority data generation section 3b1 generates the priority data for a plurality of pieces of task data (tasks) that have not been executed, respectively, among a plurality of pieces of task data stored in the task information database DB4.

A value P of the priority data of each task is calculated by Equation (1).

$$P = T'_{pri} \cdot f(T_{err}) \qquad (1)$$

where "$T'_{pri}$" is calculated by Equation (2).

$$T'_{pri} = T_{pri} + n(T_{sp}) \qquad (2)$$

where "$T_{pri}$" indicates a degree of importance of the task (before adjustment). "$T_{pri}$" is a value ranging from, for example, 1.0 (a low degree of importance) to 5.0 (a high degree of importance) with a division of 0.5 and values inputted by the operator with the terminal 5 or calculated from the individual ID (for example, information of job posts). In this embodiment, "$T_{pri}$" is determined from individual information of the visitor (information stored in the individual information database DB2 and information obtained through communication between the robot R and the visitor which information is transmitted to the robot control apparatus 3.)

Figure 10A:
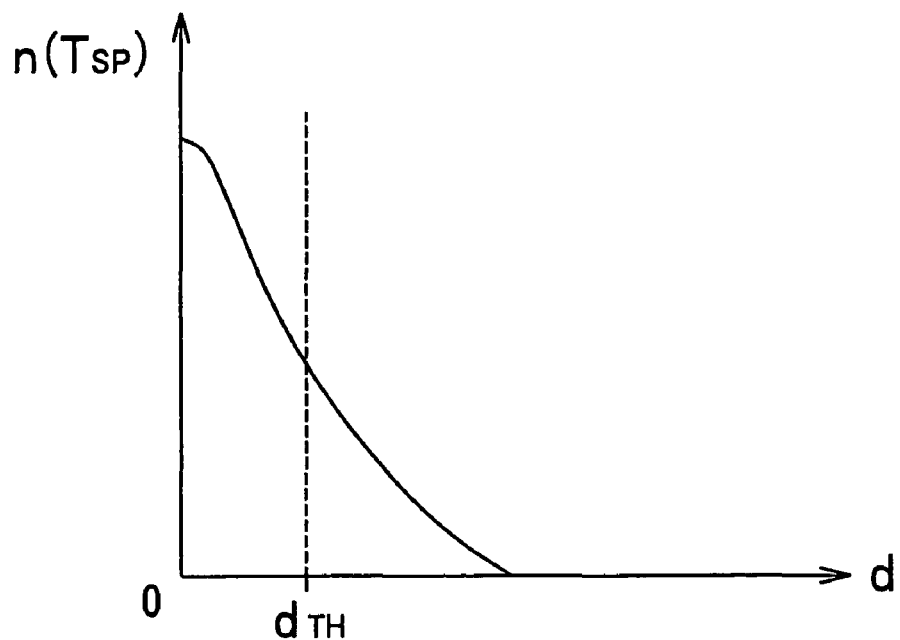
FIG. 10A is a graph illustrating a relation of a degree of importance with a distance between the adjacent robot and the task start location according to the present invention.
Figure 10B:
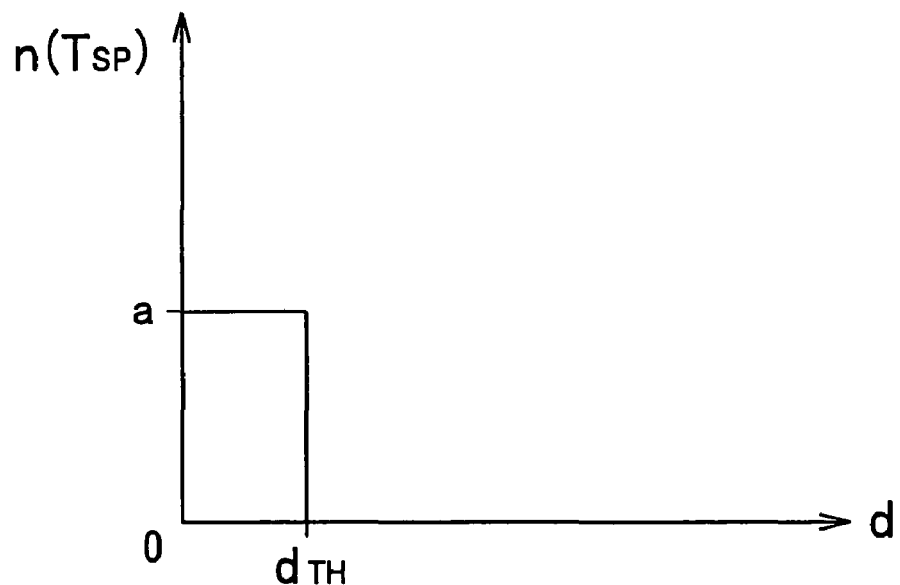
FIG. 10B is a graph illustrating a processed relation of the degree of importance with the distance between the adjacent robot and the task start location according to the present invention.

Further, "$T_{sp}$" is a value obtained by dividing a traveling distance between the start location of the task and the robot R that exists at the nearest location by an averaged walking speed of the robots R, namely, a time duration necessary for the robot R moving to the start location of the task, and term "$n(T_{sp})$" is the degree of importance for causing the robot R to execute the task at the nearest location prior to other robots. In other words, the shorter the distance "d" between the task start location and the nearest robot R is, the larger value of the degree of importance $n(T_{sp})$ is, as shown in FIG. 10A. In the present embodiment, the degree of importance $n(T_{sp})$ has a positive value "a" only when "$T_{sp}$" is not greater than a predetermined value $d_{TH}$ and is zero in other cases, as shown in FIG. 10B. As values for calculating these values, the task start locations stored in the task information database DB4 are used. Further, the current locations of the robots R stored in the robot information database DB3 are used. The calculated term "$T'_{pri}$" is a degree of importance after adjustment, and hereinafter "$T'_{pri}$" is simply referred to as "degree of importance of the task".

Further, time-varying coefficient $f(T_{err})$ in Equation (1) is "a coefficient of the degree of importance varying with time" and is calculated by Equation (3).

$$f(T_{err}) = \begin{cases} \exp\left(-K\dfrac{T_{err} - T_{time}}{T_{time}}\right) & T_{err} > (0 + T_{time}) \\ 1 & 0 \leq T_{err} \leq (0 + T_{time}) \\ \left(1 + \cos\left(\dfrac{\pi}{T_{time}} \cdot \dfrac{T_{err}}{C_{obli}}\right)\right)\Big/2 & (0 - C_{obli} \cdot T_{time}) < T_{err} < 0 \end{cases}$$

(3) where "$T_{err}$" indicates a time margin (for example, min.) that is calculated by ((Current Time)−(Scheduled Task Completion Time)), wherein the time margin $T_{err}$ has a positive value before the scheduled task completion time and a negative value after the scheduled task completion time. Further, "$C_{obli}$" is a forgetting coefficient that determines a downslope of the time-varying coefficient $f(T_{err})$, namely, the value determining a downslope of the value P of the priority data.

Figure 4:
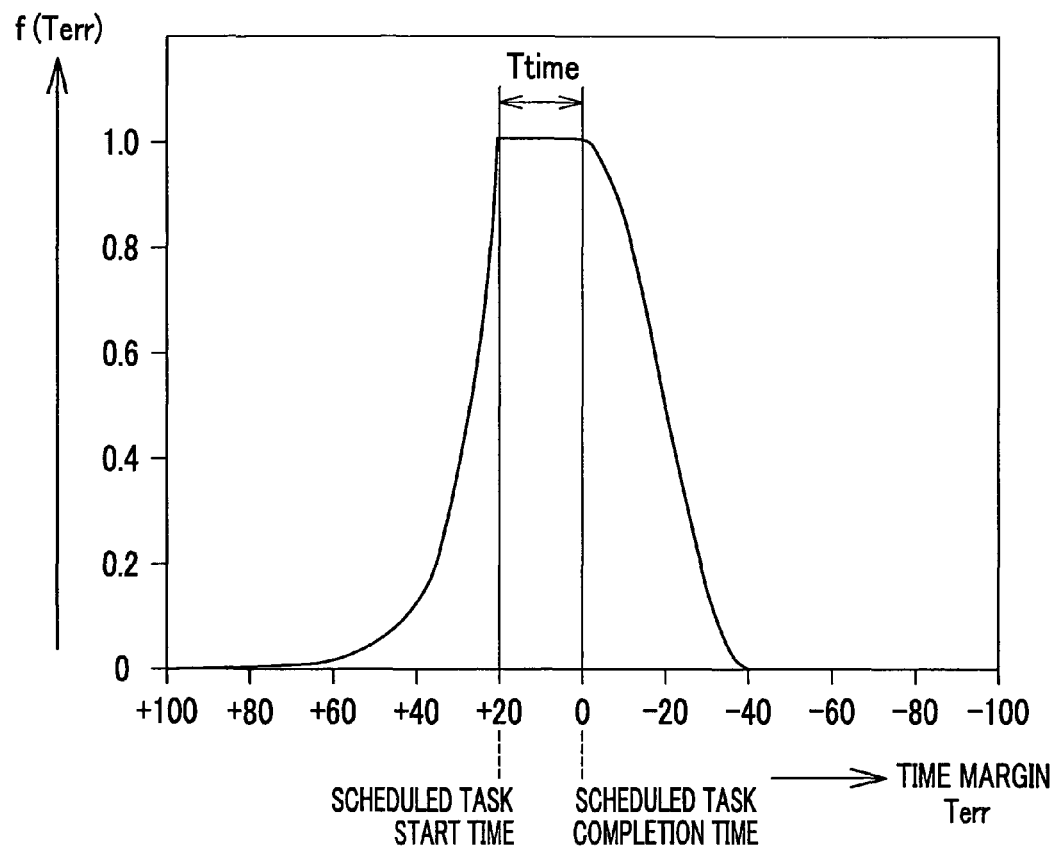
FIG. 4 is a graph illustrating a relation between degrees of importance $f(T_{err})$ and time margins $T_{err}$.

FIG. 4 shows a relation between the time margin $T_{err}$ and the time-varying coefficient $f(T_{err})$ that ranges from zero to one.

$$T_{err} > (0 + T_{time})$$

When it comes near the scheduled task start time, namely, when the time margin becomes zero from a positive value, the time-varying coefficient $f(T_{err})$ increases and becomes one when the time margin becomes "time margin necessary for processing the task". The reason is as follows:

To complete executing the task before the scheduled task completion time, the task should be started before the scheduled task start time inclusively. Thus, the time-varying coefficient $f(T_{err})$ becomes large as the scheduled task start time is nearing. When $T_{err} = T_{time}$, that is, when the current time agrees with the scheduled task start time, the time-varying coefficient $f(T_{err})$ becomes maximum.

Since the term "$T_{err}$" is more important than the degree of importance of the task "$T_{pri}$" with respect to the value P of the priority in Equation (1), a non-linear slope is adopted for the time-varying coefficient $f(T_{err})$ (see FIG. 4). The slope is dependent on a processing duration $T_{time}$ and so set that the longer processing duration $T_{time}$, the more moderate the slope becomes.

$$0 \leq T_{err} \leq (0 + T_{time})$$

This is the case when the current time is between the scheduled task start time and the scheduled task completion time. If the task is started within this time period, the task cannot be completed before the task completion time. Thus, it is in a time zone in which the task should be started as soon as possible. As a result, the time-varying coefficient $f(T_{err})$ becomes one which is the maximum value.

$$0 > T_{err} > (0 - C_{obli} \cdot T_{time})$$

Next, when the current time has passed the scheduled completion time (the time margin becomes less than zero), the time-varying coefficient $f(T_{err})$ gradually decreases from one and then becomes zero, which results in forgetting the task.

The reason why the time-varying coefficient $f(T_{err})$ is not made zero when the current time has passed the task completion time is as follows:

The task such as reception and information operation generally adopts flexible time management. For example, there may be a case where a visitor comes slightly late. In this case, the level of keeping time is not so high, thus, it is sufficient to execute the task around a certain time. Accordingly the priority of the task should be held and controlled though it has passed the task completion time. The forgetting coefficient $C_{obli}$ is set such that when $T_{err} = -C_{obli} \cdot T_{time}$, $f(T_{err}) = 0$. In other words, when $T_{err} \leq C_{obli} \cdot T_{time}$, $f(T_{err}) = 0$, namely, P=0, the forgetting coefficient $C_{obli}$ is so set as to forget the task.

Figure 5:
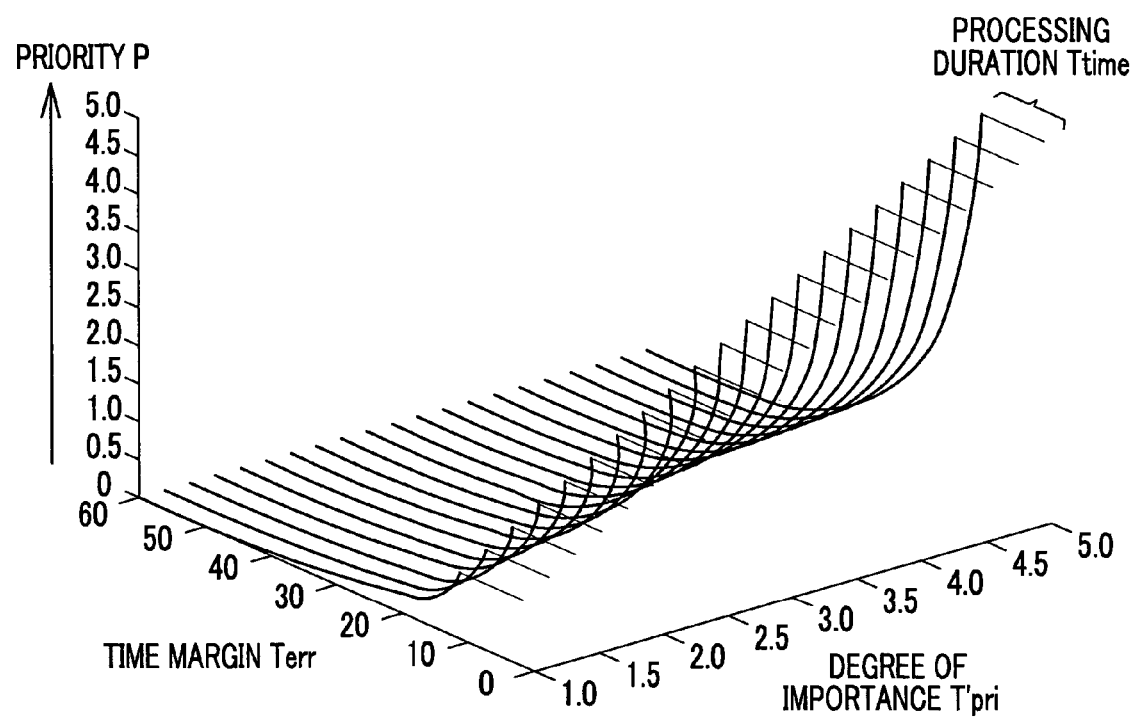
FIG. 5 is a graph illustrating a relation among degrees of importance $f(T_{err})$, time margins $T_{err}$, and priority.

FIG. 5 shows a relation among the degree of importance $T'_{pri}$ of the task, the time margin $T_{err}$, and the value P of the priority of the task.

As mentioned above, the priority data is generated on the basis of the data regarding time (timing), the data regarding the location, and the data regarding degree of importance, which provides a preferable value to the priority of the task, so that the priority data can be used in generation of schedule data mentioned hereinbelow.

Schedule Data Generation Section 3b2

The schedule data generation section 3b2 generates the schedule data in which tasks are assigned to robots, respectively, on the basis of the priority data generated by the priority data generation section 3b1.

The schedule data is used for determination as to which one of robots R executes the task and as to at which ranking of order the robot R is caused to execute the task. In other words, the schedule data includes the robot ID of the robot R caused to execute and the execution order data. Further, during assigning tasks, the scheduled start time and the scheduled completion time is generated again and is also included in the schedule data.

Hereinafter, a process of generating the schedule data will be described.

Time duration $C_{ij}$ for which a robot (i) takes to execute a task 0) is calculated by Equation (4).

$$C_{ij}=Wr+Wrh+G(\text{task type}) \quad (4)$$

where "Wr" is "time duration for which a robot (i) takes to walk to the task start location". "Wr" is calculated on the basis of the current position of the robot R stored in the robot information database DB3, the task start location stored in the task information database DB4, the map information stored in the map information database DB1, and an average walking speed of the robot R.

Further, "Wrh" is "duration for which the robot (i) takes to walk during the execution of the task. "Wrh" is calculated on the basis of the task start location and the task completion location stored in the task database DB4, the map information stored in the map information database, and the average walking speed of the robot R.

Furthermore, "G" (task type) is "duration for which the robot R takes to communicate (including gesture, conversation, or the like) with a visitor during the execution of the task. As the "G" (task type) predetermined values varying in accordance with the type of the task such as greeting, reception, and information are stored in the storing section 3c.

In addition, a cost Cr (i) regarding an amount of operation for assigned task (dependent mainly on the traveling distance) is calculated by Equation (5) with assumption that a combination upon assignment of m tasks to n robots R is k, and repeated permutation representing all combinations is M(k) ($1 \leq k \leq n^m$), and each element of the permutation is $X_{ij}$.

$$Cr(i) = \sum_{j=1}^{m} C_{ij} x_{ij} \quad (5)$$

$$x_{ij} \in \{0, 1\}$$

$$(1 \leq i \leq n)$$

A total cost $C_{all}$ regarding an amount of operation of the whole of the robot control system A (hereinafter referred to as operation cost) is the total of costs Cr(i) of respective robots and calculated by Equation (6).

$$C_{all} = \sum_{i=1}^{n} Cr(i) \quad (6)$$

Further, a cost $C_{all\ complete}$ regarding time interval necessary for completion of all tasks (hereinafter referred to as time cost) is a time interval from the earliest scheduled start time to the latest scheduled completion time, among all tasks assigned to respective robots (these values of time are those generated by the schedule data generation section 3b2) and are calculated by Equation (7).

$$C_{all\ complete} = \max_{1 \leq i \leq n} Cr(i) \quad (7)$$

Then, an optimum cost $C_{opt}$ is calculated in consideration of the operation cost $C_{all}$ and time cost $C_{all\ compete}$ by Equation (8).

$$C_{opt}=w\cdot C_{all}+(1-w)\cdot C_{all\ complete}(0 \leq w \leq 1) \quad (8)$$

where "w" is "weight for the operation of the robot against time necessary for the completion of the task". In other words, when "w" is large, the operation of the robots is more prioritized. When "w" is small, the time is more prioritized. Then, a combination "k" making "$C_{opt}$" minimum is an optimum schedule for causing a plurality of robots to execute a plurality of tasks.

The "operation-prioritized" means that reduction in the amount of operation of the robots R is prioritized. On the other hand, "duration-prioritized" means that early completion of the task is prioritized. For example, consider a case where a plurality of tasks to be executed at a narrow positional region exist. When a robot R nearly located is commanded to execute a plurality of the tasks, it reduces the amount of operation by the robots R (operation prioritized), but it takes a long time because only one robot executes the task (duration disregarded). On the other hand, when a plurality of robots are commanded to execute a plurality of the tasks, the tasks are performed earlier (duration-prioritized). However, in this case, robots remotely located should move there, which makes the amount of operation of the robot R as a whole becomes large (operation disregarded). In other words, the operation-prioritization is not always established with duration-prioritization. Then, setting "w" provides a selecting which side is more prioritized.

Next, an example of scheduling operation for the tasks will be described. FIGS. 6A to 6D illustrate the scheduling operation. In this example, there are seven tasks T1 to T7 which are processed by two robots RA and RB.

Figure 6A:
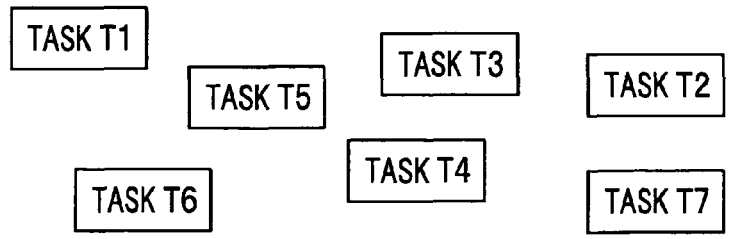
FIGS. 6A to 6D are illustrations for describing scheduling operation of tasks.

As shown in FIG. 6A, the tasks (pieces of task data) T1 to T7 are stored in the task database DB4. Then, priority data is generated for the tasks T1 to T7. It is assumed that the value P of the priority data of tasks T1>that of the task T2>that of the task T3>that of the task T4>that of the task T5>that of the task T5>that of the task T6>that of the task T7. The generated priority data is stored in the task information database DB4 with each priority data P attached to each piece of the task data.

Figure 6B:
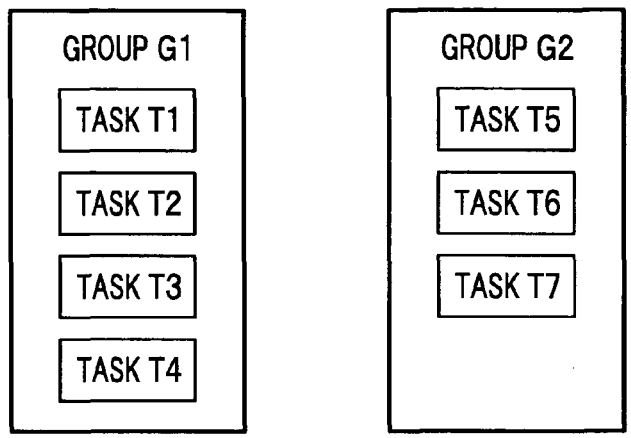

Next, as shown in FIG. 6B, the tasks T1 to T7 are grouped on the basis of the priority data of the tasks T1 to T7, respectively. In this embodiment, the tasks T1 to T7 are divided into a group G1 including the tasks T1 to T4 having high priority (values P of priority data are relatively large) and a group G2 including the tasks T5 to T7. Preferably, the grouping is done on the basis of the number of the robots R and the number of the tasks. For example, if the number of tasks are relatively large, the number of generated groups are determined by ((the number of tasks)÷(the number of the robots R)), wherein the figures after the decimal fractions in the result are rounded up. In addition, the number of groups is determined on the basis of calculation time interval and the priority regarding the calculation time in the schedule data generation section 3b2. In other words, the number of groups is determined so as to earlier complete generating the schedule data.

Figure 6C:
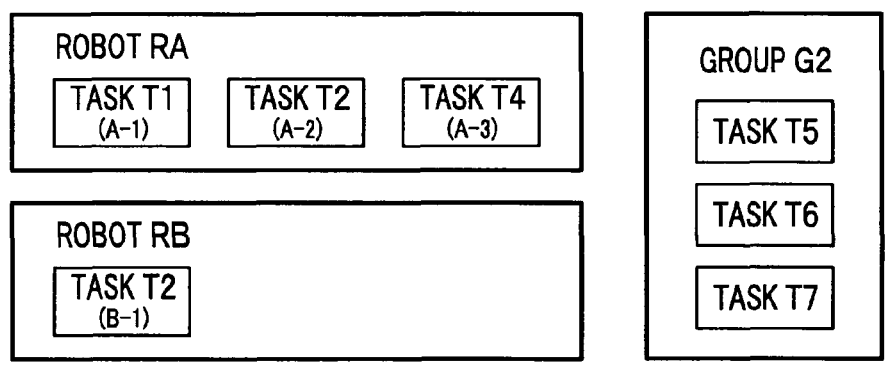

Subsequently, as shown in FIG. 6C, the tasks in the group G1 with high priority are scheduled by Equations (4), (5), and (6) (schedule data is generated). The schedule data of the task T1 is designated with "A-1". This means that the task T1 is to be executed by the robot RA first (ranking of execution order is one). Similarly, the task T2, the task T3, and the task T4 are designated with "B-1", "A-2", and "A-3". The generated schedule data is stored in the task information database DB4 with each piece of schedule data attached to the task data of each task.

Figure 6D:
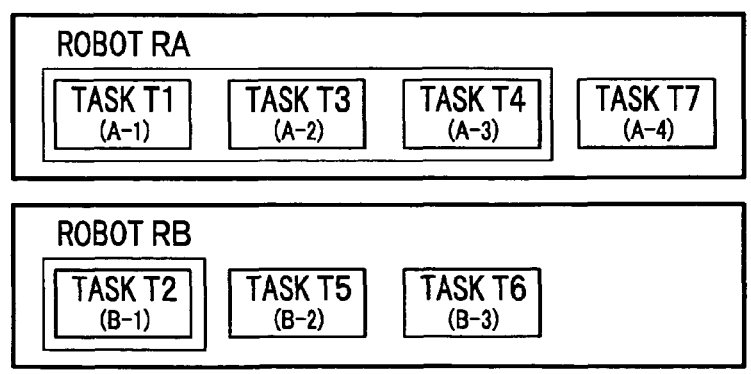

Next, the tasks T5 to T7 in the group G2 having a relatively low priority shown in FIG. 6D are scheduled by Equations (4), (5), and (6). In this operation, the tasks are scheduled with the load provided by the task data previously scheduled kept. Thus, generation of the schedule data for the latter group is done in consideration of the result of the schedule data generation of the former group to optimize the whole of generating the schedule data.

The schedule data of the tasks T5, T6, and T7 is designated with "B-2", "B-3", and "A-4", respectively and stored in the task database DB4 in such a form that the generated schedule data is attached to the task data of each task.

As mentioned above, the tasks are divided into groups and the execution of the tasks is scheduled for each group. Thus, the execution of the tasks is scheduled for each group including the given number of tasks though there are many tasks, which suppresses an increase in the number of the combinations in scheduling operation due to increase in the number of tasks. This suppresses increase in the load of the scheduling operation on the schedule data generation section 3b2.

Upon the generation of the schedule data, it is preferable to consider the data regarding conditions such as amounts of remaining energy in batteries of the robots R, and failure in the driving systems.

Execution Command Generation Section 3b3

The execution command generation section 3b3 generates the execution commands (data) for causing the robot R to execute the tasks on the basis of the schedule data generated by the schedule data generation section 3b2.

In the present embodiment, the robot apparatus 3 generates the execution commands with the highest ranking in execution order, namely execution commands to be first executed for robots R, respectively. In the above-described example, the execution command for the robot RA is generated as data including, for example, the robot ID data, the task ID data regarding the task T1, the scheduled task start time, the task start location, a task content, and a task completion location. Similarly, the robot apparatus 3 generates the execution commands for other robots R and transmits to the robots R the execution commands for all robots R, respectively. The control section 40 of the robot R compares the identification data included in the received execution command with the identification data of the robot R itself. If they agree with each other, the task indicated by the execution command is executed. Further, the robot apparatus 3 stores the execution command with relationship with the task data in the task information database DB4.

In addition to the task to be executed first, the execution command may include data regarding all tasks to be executed by the robot R.

Task Data Dividing Section 3b4

The task data dividing section 3b4 judges whether one piece of task data stored in the task information database DB4 satisfies a predetermined condition. If the piece of task data satisfies the predetermined condition one piece of the task data is divided into a plurality of pieces of task data. The predetermined condition is, for example, that it is disadvantageous or difficult for one robot R to execute the task. In this embodiment, if the task includes operation to be executed over a plurality of floors, the task data is divided for each of these floors. The condition can be adaptively modified in accordance with the specification of the robot control system A. The task data (irrespective of dividing or not dividing) is provided with data indicating that the judging process has been done and stored in the task information database DB4 as updated data.

Figure 7:
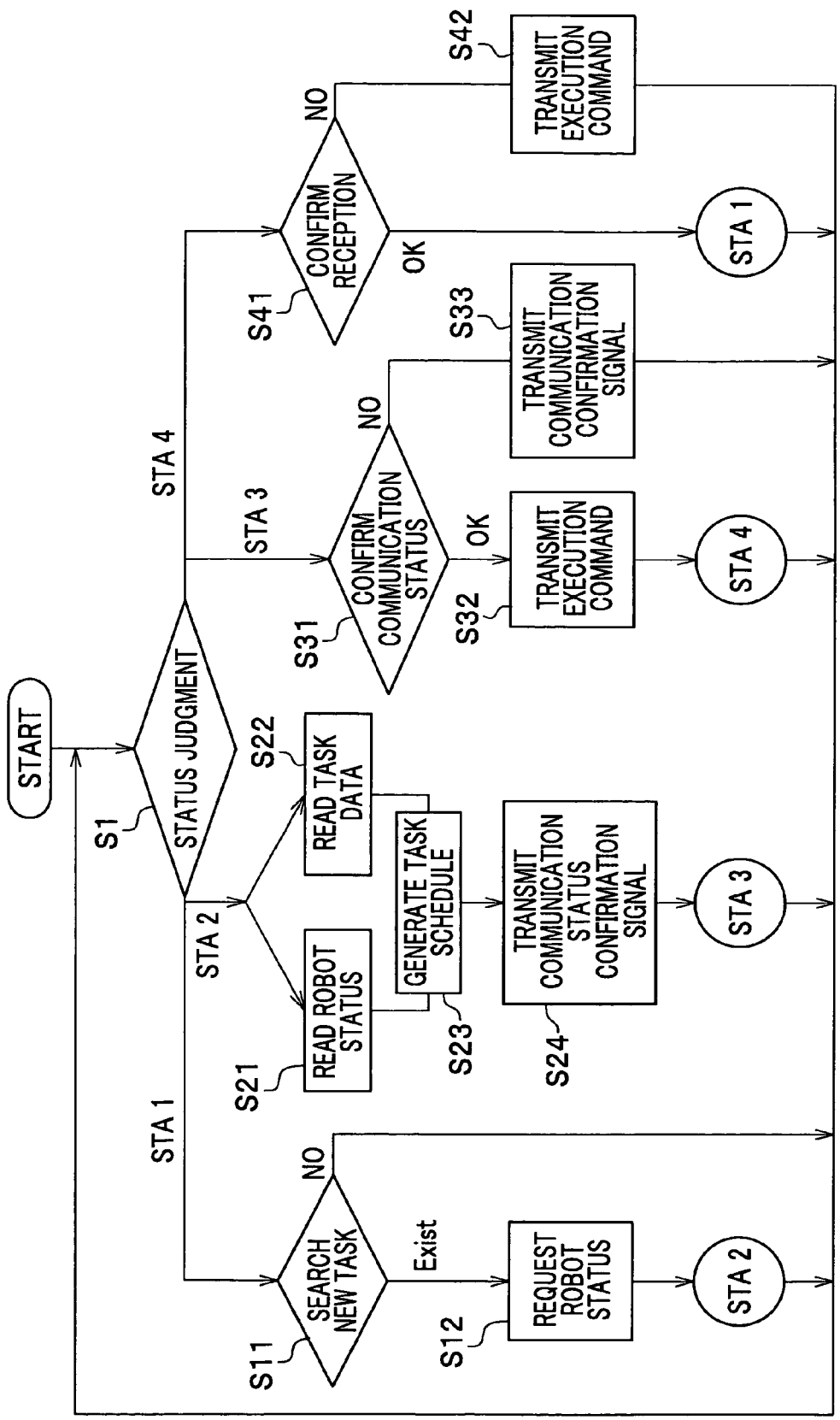
FIG. 7 depicts a flow chart illustrating operation of the robot control apparatus according to the present invention.

Next, operation of the robot control apparatus 3 will be described. FIG. 7 depicts a flow chart illustrating the operation of the robot control apparatus 3.

In a step S1, it is judged which one of operation statuses the robot apparatus 3 is in from a first status STA1, a second status STA2, a third status STA3, and a fourth status STA4 to select the following step to be executed in accordance with the result.

If the status of the robot apparatus is in the first status STA1, the robot control apparatus 3 searches the task information database DB4 to check whether there is any new task in a step S11. If there is no new task, the robot apparatus 3 repeats the process in a step S11. If there is a new task, the control section 3b transmits a robot data request signal to the robots R through the input-output section 3a. The robot R that has received the robot data request signal generates robot data in the control section 40 to transmit it to the robot control apparatus 3. The robot data is stored in the robot information database DB3. Then, the status of the robot control apparatus 3 is changed to the second status STA2. In the step S11, the robot control apparatus also searches the task information database DB4 to check whether there is any task that is cancelled by the operator with the terminal 5 and any completed task in the step S11. If the answer is YES, processing proceeds to a step S12.

Next, in the step S1, processing proceeds to a process for the second status STA2, where the control section 3b reads the robot data and the task data in steps S21 and S22 to generate priority data in the priority data generation section 3b1 and generate the schedule data in the schedule data generation section 3b2 in a step S23. The control section 3b transmits the communication status confirmation signal to the robot R through the input-output section 3a in a step S24. The robot R having received the communication status confirmation signal transmits a communication enable signal including the robot identification data to the robot control apparatus 3. Then, the status of the robot control apparatus 3 is changed to the third status STA3.

Next, processing enters the process for the third status STA3 after the step S1, and the control section 3b judges whether the communication enable signals from the robots R, respectively in a step S31. If there is any robot R transmitting no communication enable signal, the communication confirmation signal is transmitted again in a step S33, which is repeated until the communication is established. To the robots R of which communication enable signals have been received, the execution commands generated by the execution command generation section 3b3 are transmitted in step S32. The robot R having received the execution command transmits the reception confirmation signal including the robot identification data to the robot control apparatus 3. Then, the status of the robot control apparatus 3 is changed to the fourth status STA4.

Processing enters the process for the status STA4 after the step S1, and the control section 3b checks whether the reception confirmation signals from the robots R, respectively in a step S41. If there is any robot R to which the execution command is transmitted and from which the reception confirmation signal cannot be received, the execution command is transmitted again, which is repeated until the reception confirmation is achieved. When reception confirmation signals have been received from all robots R to which the execution commands have been transmitted, the status of the robot control apparatus 3 is changed to the first status STAL.

Figure 8:
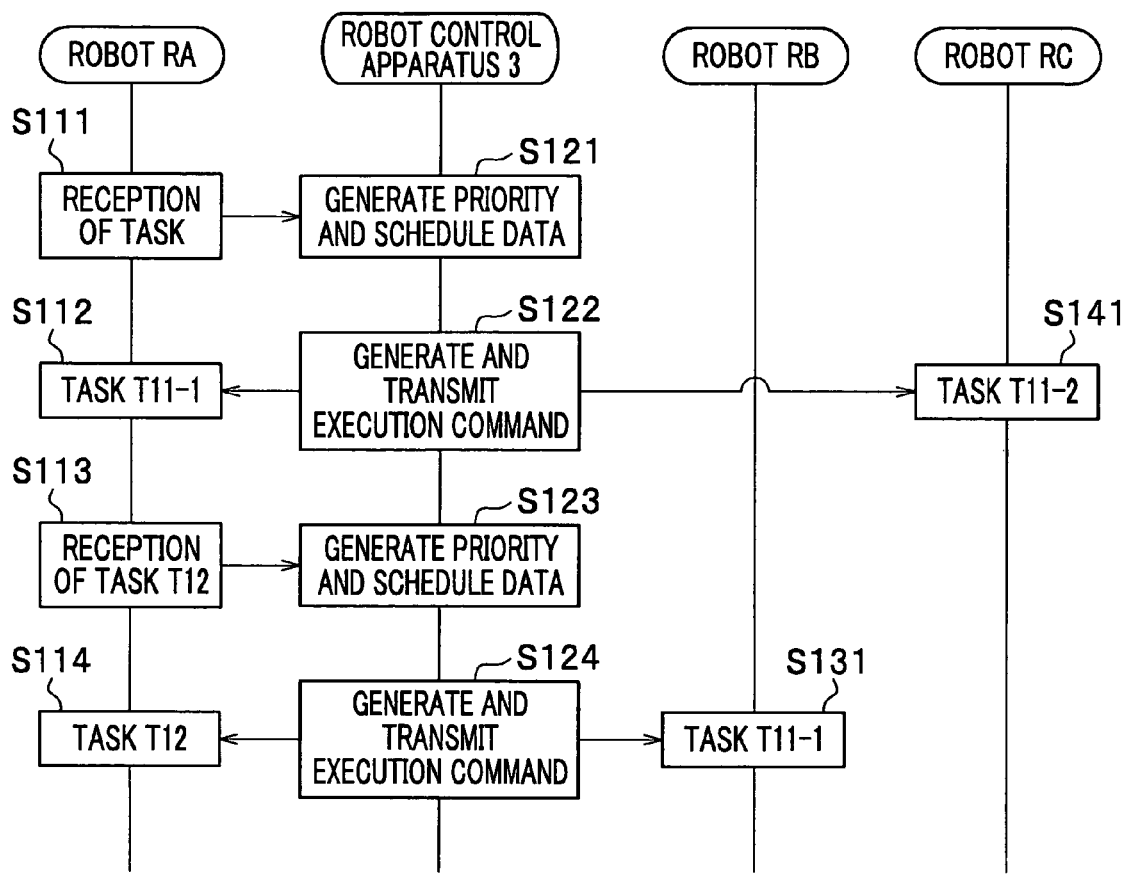
FIG. 8 is an illustration of sequential operation of the robot control system according to the present invention.

Next, an example of operation of the robot control system will be described. FIG. 8 illustrates sequential operations of the robot control system.

First, the robot RA at the first floor communicates with a visitor VA (not shown) and receives a request from the visitor VA to generate task data T11 in a step S111. The content of the task T11 is that the visitor A is guided from the current place at the first floor to a meeting room at the third floor. The generated task data is applied to the robot control apparatus 3 through the wireless communication section 60 and the base station 1.

The task data from the robot RA is stored in the task information database DB4. In that event, the task data dividing section 3b4 recognizes that the floor indicated by the task start location (first floor) of the task T11 is different from that indicated by the task completion location (third floor), and thus, makes judgment whether the task T11 is divided. Then, the task T11 is divided into a task T11-1 that the visitor VA is guided from the current location at the first floor to a door of an elevator at the first floor and a task T-2 that the visitor VA is guided from a door of the elevator at the third floor to the meeting room. The divided tasks T11-1 and T11-2 are stored in the task information database DB4.

After completion that new tasks are stored in the task information database DB4, the priority data generation section 3b1 generates priority data for the task T11-1 and the task T11-2. The generated priority data is stored in the task information database DB4. Subsequently, the schedule data generation section 3b2 generates the schedule data on the basis of the priority data in a step S121.

The execution command generation section 3b3 generates execution commands. In this case, the execution command generation section 3b3 generates an execution command for causing the robot RA to execute the task T11-1 and an execution command for commanding the robot RC to execute the task T11-2. Further, the robot control apparatus 3 transmits a communication confirmation signals to the robots R to confirm the communication statuses with the robots R, respectively. When confirming that the communication status allows communication, the robot control apparatus 3 transmits execution commands in a step S122. The robot RA refers to robot identification data included in the execution commands to start a preparation operation (traveling to a task start location) for the execution of the task T11-1 in a step S112. Similarly, the robot RC starts preparation for execution of the task T11-2 in a step S141.

During preparation and execution of the task T11-1, the robot RA communicates with a visitor VB (not shown) and receives a request to generate a task T12 in step S113. The task T12 has a content of reception of the visitor VB. The generated task data is supplied to the robot control apparatus 3 through the wireless communication section 60 and the base station 1.

The received task data is stored in the task information database DB4. The priority data generation section 3b1 confirms that a new task is stored in the task database DB4 and generates values P of priority data of the task T11-1, the task T11-2, and the task T12. The generated priority data is stored in the task information database DB4. Subsequently, the schedule data generation section 3b2 generates the schedule data on the basis of the priority data in a step S123.

The execution command generation section 3b3 generates the execution command. In this case, the execution command generation section 3b3 generates execution commands for causing the robot RA to execute the task T12, for causing the robot RB to execute the task T11-1, and for causing the robot RC to execute the task T11-2. Further, the robot control apparatus 3 confirms the communication statuses of respective robots R. When the communication enable statuses are confirmed, the robot control apparatus 3 transmits an execution command in a step S124. In that event, since the task for the robot RC is unchanged, the transmission operation is omitted. The robot RA refers to the robot identification data included in the execution commands out of the received execution commands to start a preparation operation (traveling to a task start location) for the execution of the task T12 in a step S114. In this process, preferably, preparation for the execution of the task T12 is started after the robot RA informs that another robot will serve for the visitor VA. Similarly, the robot RB starts preparing execution of the task T11-1 in a step S131.

When completing the executing the task, each of the robots R may generate a task completion signal including the task identification data to transmit it to the robot control apparatus 3. When receiving the task completion signal, the control section 3b stores data indicating completion of the task in the task information database DB4. Instead of this, an execution command for the task with a second highest ranking in the execution order may be generated and transmitted. Further, the priority data is generated again with the completed task removed.

As mentioned above, the robot control apparatus 3 generates the priority data and the schedule data on the basis of the generated priority data. Next, the robot control apparatus 3 generates the execution commands on the basis of the schedule data to transmit the execution commands to respective robots R, which causes the robots R to execute the tasks, respectively with a high efficiency in executing the tasks.

Regarding timing of generating the priority data, preferably it is generated when new task data is stored in the task information database DB4, when it is confirmed with the task completion signal that the task in the task information database DB4 is completed, or when the value P of the priority data of the task becomes zero after the scheduled task start time has elapsed.

Further, when the amount of remaining energy in the battery of any robot R becomes less than a predetermined value, or when failure occurs in the driving system, the robot R transmits the robot data including the data to the robot control apparatus 3. The robot control apparatus 3 generates the schedule data and the execution commands again to command the robots other than the interesting robot R (a low amount of energy) to execute the task. Furthermore, the robot R with the amount of remaining energy is less than a predetermined value may move in an autonomous manner to a battery charger provided at a predetermined location of the building to be charged there in an autonomous manner.

The embodiment of the present invention is described above. However, the present invention is not limited to the above-described embodiment, but may be modified. For example, the task is not limited to reception and information operation, but this invention is applicable to any type of operation in which a task is executed by a plurality of robots. Further, the robot control apparatus 3 may comprise an input section for receiving the task data and an output section for outputting data from the various types of databases.

In the above-described embodiment, each of the tasks includes scheduled task start time indicating start time of the task. The priority data may be generated such that the closer to the scheduled task start time time when the priority data is generated is, the higher the priority becomes.

Figure 9:
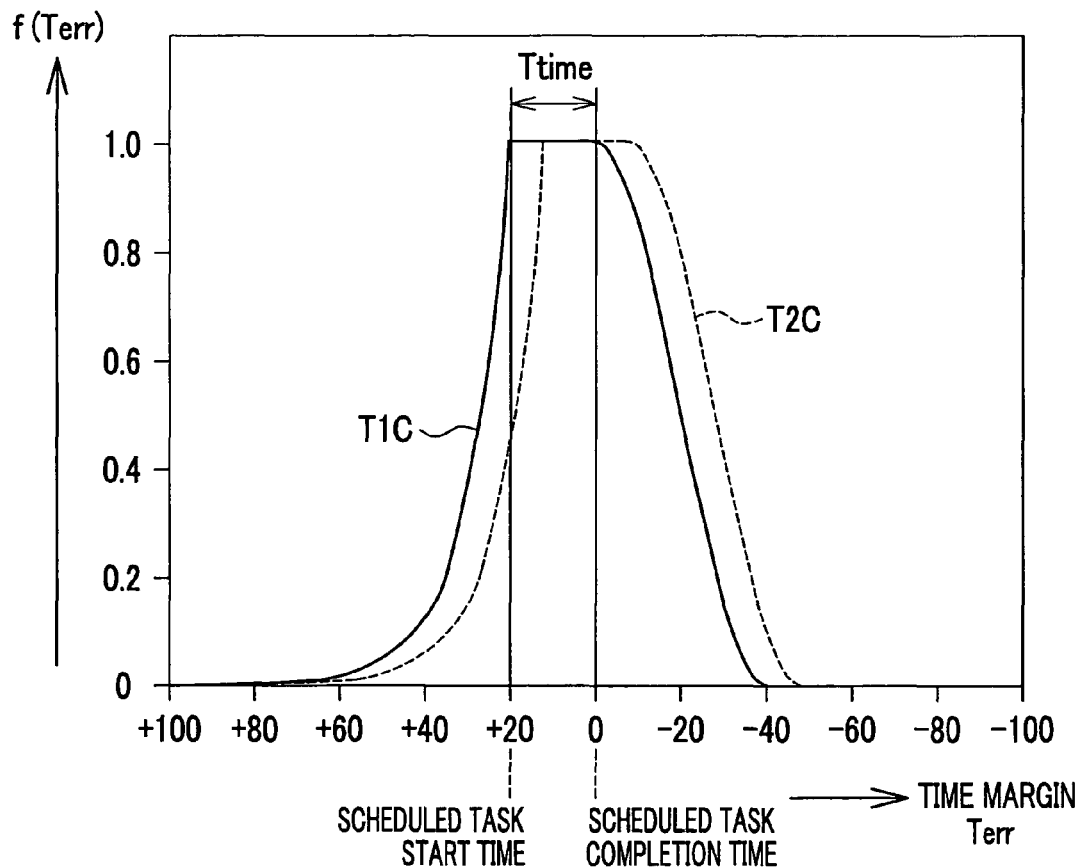
FIG. 9 is a graph illustrating a relation between degrees of importance $f(T_{err})$ of two tasks according to the present invention.

More specifically, each of the tasks includes scheduled task start time indicating the start time of the task, and the priority data is generated repeatedly, for example, every when a new task is stored or received, execution of a task has been completed, or a task has been cancelled. Then, the priority (the time-varying coefficient of the degree of importance f(Terr)) is generated such that one of the tasks has first and second priorities at first and following second timing, respectively (at, for example, time margins of +60 and +40 in FIG. 4) before the scheduled task start time (time margin of +20), wherein the second priority (at time margin of +40) is higher than the first priority (at time margin of +60). Further, for example, there is a relation in priority between, for example, different tasks T1 and T2 to be executed at different task start timing as shown in FIG. 9. Then, first and second of the tasks T1 and T2 include first and following second scheduled task start time indicating the start timing of the first and second of the tasks T1 and T2, respectively, and the priority data is generated before the first scheduled task start time such that the first and second of the tasks have first and second priorities, respectively ((the time-varying coefficients of the degree of importance f(Terr): curves T1C and T2C, respectively), the first priority being higher than the second priority at, for example, a time margin of +30 of the task T1.

In the above-described embodiment, the schedule data may be generated, in a step S23 (FIG. 7), such that a task completion location of one of the tasks having $n^{th}$ ranking of the execution order is determined as a location (FIG. 3) of the robot having executed the one of the tasks for another one of the tasks having $(n+1)^{th}$ ranking of the execution order and generate the schedule data. This makes the traveling distance small or can complete the task earlier. The location of the robot is stored in the robot information database DB3 for generating the schedule data of another one of the tasks having $(n+1)^{th}$ ranking of the execution order.

Furthermore, the schedule data is generated either such that traveling distances of the robots are made smaller or such that the tasks complete earlier.

In addition, a cover area is assigned to each of the robots (for example, for each floor), and the task data dividing section 3b4 generates the division task data for each the cover area when the task start location and the task completion location indicate different floors.

According to the present invention, in the robot control apparatus, communicable with a plurality of mobile robots, for executing a plurality of tasks, the tasks are received and stored as task data. The tasks are assigned to the robots to integrally control the robots, wherein the execution order and assignment of the tasks is determined in accordance with the priority of the tasks. The execution order (priority data) and the assignment of the tasks is determined again when a new task is received, when a task has been executed, and when an unexecuted task is cancelled. The priority is determined on the basis of the time regarding the execution of the tasks including task execution start time (scheduled task start time), processing durations of the tasks, completion time of the tasks (scheduled task completion time). Further, the priority is determined on the basis of the locations including the current locations of the robots, the (scheduled) task start locations, the (scheduled) task completion locations. Furthermore, the priority is determined on the basis of the degree of importance dependent on, for example, the person (important or usual) and emergency operation. Still further, the priority is determined on the basis of loads of the robots, and the amounts of remaining energy in the batteries of the robots. In addition, the priority may be determined in accordance with combination of the above-described conditions.

The priority is determined as mentioned above, so that one task being executed can be received during execution of another task. Further, the priority is determined in accordance with the execution completion time or the execution cost as the whole of the system, which eliminates useless operations by the robots. Further, the one task being executed can be interrupted or cancelled by another task.

The autonomous robot R may approach a person (visitor or the like) to positively receive a task by, for example, inquiry conversation by the autonomous mobile robot. The robot R interprets the conversation to receive a task. The task may be divided into more than one task to execute the original task by more than one autonomous mobile robot, so that a task for a person may be relayed one autonomous mobile robot to another autonomous mobile robot. In other words, a former part (regarding time) of the task (for example, the task at first floor) executed by one robot, and subsequently the remaining part of the tasks (to be executed at the third floor) is executed by another robot after completion of the former part of the task under control of the robot control apparatus 3. In that event, the information of one of the robot may be transmitted to another robot vice versa.

The invention claimed is:

1. A robot control apparatus, communicable with a plurality of robots that include locomotive functions, for executing one or more tasks, comprising:
   an input-output section for receiving the tasks as task data;
   a task data storing section for storing the tasks from the input-output section;
   individual data storing section for storing individual data regarding human beings who communicate with the robots, wherein the robot control apparatus commands the robots to communicate with one of the human beings on the basis of the individual data;
   a priority data generation section for generating priority data indicating values of priorities regarding execution of the stored tasks at least in accordance with the tasks;
   a schedule data generation section for generating, in accordance with the priority data, schedule data indicating which one of robots is commanded to execute each of the tasks and execution order of the tasks;
   an execution command generation section for generating an execution command for commanding a one of the robots to execute one of the tasks with a highest ranking of the execution order; and
   a transmitting section for transmitting the execution command to the one of robots through the input-output section.

2. The robot control apparatus as claimed in claim 1, wherein the task data of each task includes a value of scheduled task start time indicating start time of the task, and the priority data is generated such that the closer to the scheduled task start time when the priority data is generated is, the higher the priority becomes.

3. The robot control apparatus as claimed in claim 2, wherein when a new task is stored in the task data storing section as the task, when any of the tasks has been executed, and when any of the tasks is cancelled, the priority data generating section generates the priority data again.

4. The robot control apparatus as claimed in claim 2, wherein the tasks are grouped into a plurality of groups on the basis of the priority data, wherein the schedule data is generated for each group.

5. The robot control apparatus as claimed in claim 4, the schedule data generation section determines the number of the groups on the basis of at least one of the number of the robots and the number of the tasks.

6. The robot control apparatus as claimed in claim 2, wherein the task data of each task selectively includes a value of scheduled task completion time, and the priority data generation section generates the priority data on the basis of at least one of the values of the scheduled task start time and the scheduled task completion time.

7. The robot control apparatus as claimed in claim 2, wherein the task data of each task includes at least one of a task start location and a task completion location, and the priority data generation section generates the priority data on the basis of at least one of the task start location and the task completion location.

8. The robot control apparatus as claimed in claim 2, wherein the tasks data of each task includes at least one of a start location and a task completion location, and the schedule data generation section generates the schedule data in accordance with at least one of the task start location and the task completion location.

9. The robot control apparatus as claimed in claim 2, wherein the task data of each task includes a degree of importance of the task, and the priority data generating section generates the priority data on the basis of the degree of the importance.

10. The robot control apparatus as claimed in claim 2, further comprising a robot data storing section for storing robot data including locations of the robots supplied from the robots through the input-output section, wherein the priority data generating section generates the priority data such that the smaller the distance between the task start location and the location of the robot closest to the task start location is, the higher the priority is.

11. The robot control apparatus as claimed in claim 2, further comprising robot data storing section for storing robot data including locations of the robots supplied from the robots through the input-output section, wherein the task data of each task includes a task start location and a task completion location, wherein the schedule data generating section generates the schedule data on the basis of at least one of the locations of the robots, the task start locations, and the task completion locations.

12. The robot control apparatus as claimed in claim 11, wherein the schedule data is generated such that a task completion location of one of the tasks having $n^{th}$ ranking of the execution order is a location of the robot having executed the one of the tasks for another one of the tasks having $(n+1)^{th}$ ranking of the execution order and generate the schedule data.

13. The robot control apparatus as claimed in claim 11, wherein the schedule data generation section generates the schedule data either such that traveling distances of the robots are made smaller or such that the tasks complete earlier.

14. The robot control apparatus as claimed in claim 2, comprising a task data dividing section for determining whether one of the tasks is to be divided into a plurality of tasks and dividing the one of the tasks into a plurality of tasks when it is determined that the one of the tasks is to be divided into a plurality of the tasks.

15. The robot control apparatus as claimed in claim 14, wherein the task data of one of the tasks includes a task start location and a task completion location, and the task data dividing section determines whether or not the task data is divided on the basis of the task start location and the task completion location.

16. The robot control apparatus as claimed in claim 15, wherein the robots are located at least two floors of a building, and the task data dividing section generates the divided task data for each of the floors when the task start location and the task completion location indicates at least two of different floors.

17. The robot control apparatus as claimed in claim 15, wherein a cover area is assigned to each of the robots, and the task data dividing section generates the divided task data for each cover area, when the task start location is different from the task completion location.

18. The robot control apparatus as claimed in claim 15, further comprising a robot data storing section for storing robot data including the locations of the robots entered through the input-output section from the robots, wherein the task data of one of the tasks includes a task start location and a task completion location, and the task data dividing section determines whether or not the task data is divided on the basis of the task start location and the task completion location.

19. The robot control apparatus as claimed in claim 18, further comprising a map information storing section for storing map information regarding an area where the robots are movable, wherein the robots can travel on the basis of the map information.

20. The robot control apparatus as claimed in claim 2, further comprising individual data storing section for storing individual data regarding human beings who possibly communicate with the robots, and wherein the robot control apparatus commands the robot to communicate with one of the human beings on the basis of the individual data.

21. The robot control apparatus as claimed in claim 2, wherein the priority data generation section obtains degrees of importance of the tasks from the individual data and generates the priority data on the basis of the degrees of importance of the tasks.

22. The robot control apparatus as claimed in claim 2, wherein each of the task data is entered through the input-output section from one of the robots and stored in the task data storing section.

23. The robot control apparatus as claimed in claim 1, wherein when a new task is stored in the task data storing section as the task, when any of the tasks has been completed, and when any of the tasks is cancelled, the priority data generating section generates the priority data.

24. The robot control apparatus as claimed in claim 1, wherein the tasks are grouped into a plurality of groups on the basis of the priority data, wherein the schedule data is generated for each group.

25. The robot control apparatus as claimed in claim 1, the schedule data generation section determines the number of the groups on the basis of at least one of the number of the robots and the number of the tasks.

26. The robot control apparatus as claimed in claim 1, wherein the task data of each task includes at least one of values of scheduled task start time and scheduled task completion time, and the priority data generation section generates the priority data on the basis of at least one of the values of the scheduled task start time and the scheduled task completion time.

27. The robot control apparatus as claimed in claim 1, wherein the task data of each task includes at least one of a task start location and a task completion location, and the priority data generation section generates the priority data on the basis of at least one of the task start location and the task completion location.

28. The robot control apparatus as claimed in claim 1, wherein the tasks data of each task includes at least one of a start location and a task completion location, and the schedule data generation section generates the schedule data in accordance with at least one of the task start location and the task completion location.

29. The robot control apparatus as claimed in claim 1, wherein the task data of each task includes a degree of importance of the task, and the priority data generating section generates the priority data on the basis of the degree of the importance.

30. The robot control apparatus as claimed in claim 1, further comprising a robot data storing section for storing robot data including locations of the robots supplied from the robots through the input-output section, wherein the priority data generating section generates the priority data such that the smaller the distance between the task start location and the location of the robot closest to the task start location is, the higher the priority is.

31. The robot control apparatus as claimed in claim 1, further comprising robot data storing section for storing robot data including locations of the robots supplied from the robots through the input-output section, wherein the task data of each task includes a task start location and a task completion location, wherein the schedule data generating section generates the schedule data on the basis of at least one of the location of the robot, the task start location, and the task completion location.

32. The robot control apparatus as claimed in claim 31, wherein the schedule data is generated such that a task completion location of one of the tasks having $n^{th}$ ranking of the execution order is a location of the robot having executed the one of the tasks for another one of the tasks having $(n+1)^{th}$ ranking of the execution order and generate the schedule data.

33. The robot control apparatus as claimed in claim 31, wherein the schedule data generation section generates the schedule data either such that traveling distances of the robots are made smaller or such that the tasks complete earlier.

34. The robot control apparatus as claimed in claim 1, comprising a task data dividing section for determining whether one of the tasks is to be divided into a plurality of tasks and divides the one of the tasks into a plurality of tasks when it is determined that the one of the tasks is to be divided into a plurality of the tasks.

35. The robot control apparatus as claimed in claim 34, wherein the task data of one of the tasks includes a task start location and a task completion location, and the task data dividing section determines whether or not the task data is divided on the basis of the task start location and the task completion location.

36. The robot control apparatus as claimed in claim 35, wherein the robots are located at least two floors of a building, and the task data dividing section generates the divided task data for each of the floors when the task start location and the task completion location indicate at least two of different floors.

37. The robot control apparatus as claimed in claim 35, wherein a cover area is assigned to each of the robots, and the task data dividing section generates the divided task data for each cover area, when the task start location is different from the task completion location.

38. The robot control apparatus as claimed in claim 35, further comprising a robot data storing section for storing robot data including the location of the robot entered through the input-output section from the robot, wherein the task data of one of the tasks includes a task start location and a task completion location, and the task data dividing section determines whether or not the task data is divided on the basis of the task start location and the task completion location.

39. The robot control apparatus as claimed in claim 38, further comprising map information storing section for storing map information regarding an area where the robots are movable, wherein the robots are can travel on the basis of the map information.

40. The robot control apparatus as claimed in claim 1, wherein the priority data generation section obtains degrees of importance of the tasks from the individual data and generates the priority data on the basis of the degrees of importance of the tasks.

41. The robot control apparatus as claimed in claim 1, wherein each of the task data is entered through the input-output section from one of the robots and stored in the task data storing section.

42. The robot control apparatus as claimed in claim 2, wherein each of the tasks includes scheduled task start time indicating the start time of the task, the priority data is generated such that one of the tasks has first and second priorities at first and following second timings of generation of the priority data before the scheduled task start time, respectively, and the second priority is higher than the first priority.

43. The robot control apparatus as claimed in claim 2, wherein the first and second of the tasks include first and following second scheduled task start time indicating the start timing of the first and second of the tasks, respectively, the priority data is generated before the first scheduled task start time such that the first and second of the tasks have first and second priorities, respectively, and the first priority being higher than the second priority.

44. The robot control apparatus as claimed in claim 2, wherein each of the tasks includes scheduled task start time indicating the start time of the task, the priority data is generated such that one of the tasks has first and second priorities at first and following second timing of generation of the priority data, respectively, before the scheduled task start time, and the second priority is higher than the first priority.

45. The robot control apparatus as claimed in claim 2, wherein the first and second of the tasks include first and following second scheduled task start time indicating the start timing of the first and second of the tasks, respectively, the priority data is generated before the first scheduled task start time such that the first and second of the tasks have first and second priorities, respectively, and the first priority being higher than the second priority.

* * * * *